United States Patent Office 3,441,386
Patented Apr. 29, 1969

3,441,386
LEACHING POTASSIUM SALTS FROM MIXTURES IN THE PRESENCE OF SOLUBLE FERRIC, CHROMIC AND ALUMINUM SALTS
Giacinto Veronica, Novara, Italy, assignor to Montecatini Edison S.p.A., Milan, Italy
No Drawing. Filed Sept. 29, 1966, Ser. No. 583,090
Claims priority, application Italy, Oct. 1, 1965, 22,032/65
Int. Cl. C01d 1/30
U.S. Cl. 23—297           4 Claims It is known that in the potassium salts industry one of the most frequent problems is to separate the potassium component from sodium chloride (halite) which represents the most common and generally most abundant impurity in the starting minerals or in the intermediate salts of the processes.

A widely followed process is the so-called "selective leaching process" based upon the relation of solubility to temperature, shown by some potassium salts as contrasted to halite. A cold saturated solution of both NaCl and the potassium salt to be separated dissolves more potassium salt than halite when warm. Thus a cyclic process between two thermal levels, in which the solid phase at the higher temperature is essentially represented by halite and at the lower temperature by the potassium salt (in general schoenite, KCl or mixtures thereof) can be utilized.

Another related process consists of the controlled evaporation of solutions of the starting halite-potassium salt mixture, in which the solutions are evaporated in the warm until the solubility product of sodium chloride, but not that of potassium salt, is overcome. In this case also there is a separation of NaCl in the warm and a successive separation of the potassium salt by cooling the warm solution of the first stage. The cold solution of the second stage is generally recycled to the beginning of the process.

In both cases the greater the temperature difference used, the greater the yield, expressed as amount of potassium salt crystallized per volume unit of solution. In practice, this condition is reached by raising the upper temperature level, since the lower one has an economically insurmountable limit based upon the temperature of the cooling water available (15–25° C.).

The leaching (or the dissolution) at high temperatures (80–100° C.) however presents some remarkable inconveniences:

(a) because of the nature of the starting salt and/or the solution residue recycle of each operation, the quinary system K—Na—Mg—Cl—SO$_4$ is obtained. The higher the working temperature, the more easily this causes the formation of equilibria Na—Mg of the type:

(1)
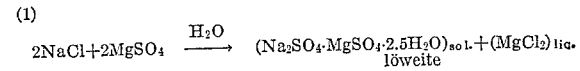
$$2NaCl + 2MgSO_4 \xrightarrow{H_2O} (Na_2SO_4 \cdot MgSO_4 \cdot 2.5H_2O)_{sol.} + (MgCl_2)_{liq.}$$
löweite (2)
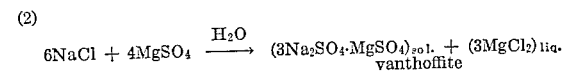
$$6NaCl + 4MgSO_4 \xrightarrow{H_2O} (3Na_2SO_4 \cdot MgSO_4)_{sol.} + (3MgCl_2)_{liq.}$$
vanthoffite This militates against or renders impossible the recycle of the solutions, since upon MgCl$_2$ enrichment they no longer have the same dissolving power on the starting salt mixture.

(b) A high temperature difference limits the selectivity of the operation. In the above systems, sodium chloride, in fact, has a not negligible positive coefficient of solubility and, therefore, the higher the temperature used in the heating stage, the more halite impurity in the salt obtained in the cooling stage.

(c) The cost of the operation is proportional to the thermal level reached in the heating stage.

In order to avoid these inconveniences, it is necessary to reduce the heating temperature and/or to limit to very small values the contact time. In the first case, the equilibrium concentration of dissolved K$_2$O, however, is obviously proportionally limited, while in the second case, the dissolving power of the solution with respect to the potassium salt is not completely utilized due to the rapidity of the operation. It is also difficult in the latter case to obtain a complete separation of the two equilibrium phases within the very short times required in normal industrial technology.

It is an object of this invention to overcome these difficulties. Applicant has now found that it is possible to obtain, at relatively moderate temperatures, equilibrium states with a saturation of potassium corresponding to that obtainable at a much higher temperature, by addition of small amounts of a soluble salt of a trivalent metal selected from those capable of giving the so-called "alums," namely Al, Cr, Fe. The preferred salts are sulfates, chlorides and nitrates. The amount of salt used varies from 1 to 4 g./l. expressed as the metal oxide M$_2$O$_3$. This addition modifies the saturation equilibrium of potassium only but not that of the other ions. The solution obtained, therefore, has a NaCl concentration and a tendency toward reactions (1), (2) that are predicated upon the temperature actually used, while it has a remarkably higher K$_2$O concentration. In other words, the solutions obtained at moderate temperature and in the presence of the said substances added are supersaturated in respect of potassium only as contrasted to those obtainable, under usual conditions, at the same temperature. This state of supersaturation, even if not unlimited in duration, remains for a much longer time than that necessary for normal industrial requirements and can therefore for practical purposes be considered as a stable equilibrium condition.

Analogously, another practical stable state of equilibrium is that of the system modified according to the present invention toward reactions (1), (2). The adoption of a moderate temperature slows down the relevant rates such that only after very long times does one observe the presence of double sodium-magnesium sulfates. Furthermore, the higher the concentration of salt of trivalent element, the higher the supersaturation of potassium.

One way of practising the present invention consists in leaching at a moderate temperature, preferably at about 50° C., the halite-potassium salt mixture so as to practically solubilize the whole potassium amount. The solid phase in this operation consists substantially of halite and is separated according to the prior art. The warm solution is then subjected to cooling thereby obtaining the potassium salt, impure of the halite amount, corresponding to the difference of saturation between 50° C. and the cooling temperature (15–25° C.). The cold solution is recycled to the beginning of the process. In general, its content of added salt of a trivalent element is less than the original amount added only for the small fraction which corresponds to the loss of liquid by imbibition of the solid products. The concentration of the said salts is, in fact, usually controlled as to preclude crystallization of the corresponding potassium alum in the cooling stage, but it preferably approaches the relevant limit value in order to assure the maximum supersaturation of potassium.

The same process is also followed when, due to the need of separating a third scarcely soluble component (potassic or not) from the original mixture, also the whole halite amount contained in the same mixture must be dissolved in addition to the soluble potassium salt. In this case, the separation of these two substances must be carried out through the evaporation of the relevant solution. In this case, too, one must strive for liquid phases with a K/Na ratio as high as possible in order to have the maximum yield of separation.

Another way of practising the present invention consists in carrying out the leaching at a higher temperature (80–100° C.) for a short time and then cooling the warm pulp to 40–60° C., preferably to 50° C. This process has the inconvenience of a higher waste of energy but, under given conditions, can represent a convenient alternative; for example, when the solution rate of the potassium salt is exceedingly slow at the lower temperatures resulting in an excessive burden because of higher equipment costs, agitation energy, survey, handling, etc., or a burden on the same order as that required at the higher thermal level by which the desired saturation value is reached in a much shorter time.

The examples reported hereinbelow are given to illustrate the modalities of the process and the results obtainable without limiting the scope of the invention.

EXAMPLE 1

This example shows the poor results obtained by a normal leaching.

A solution containing 148.65 g./l. of $MgCl_2$, 135.38 g./l. of NaCl, 26.23 g./l. of $MgSO_4$ and 96.38 g./l. of $K_2SO_4$ is heated to 85° C. This solution is used to leach a mixture consisting of 55% of schoenite, 35% of NaCl, 10% of kainite, taken in amount corresponding to the practically complete dissolution of $K_2O$. The undissolved residue at 85° C. has the composition: 1.2% $MgCl_2$, 90% NaCl, 1% $MgSO_4$, 1.1% $K_2SO_4$ (the remainder being water). The solution practically saturated at 85° C. contains: 138.75 g./l. of $MgCl_2$, 160.52 g./l. of NaCl, 66.57 g./l. of $MgSO_4$ and 141.7 g./l. of $K_2SO_4$. By cooling this solution to 25° C., a mother liquor having practically the same composition as the initial one (146.48 g./l. of $MgCl_2$, 138.17 g./l. of NaCl, 25.49 g./l. of $MgSO_4$ and 96.38 g./l. of $K_2SO_4$) and a salt consisting of 17.2% of NaCl, 25.4% of $MgSO_4$ and 33.4% of $K_2SO_4$ (the remainder being $H_2O$) are obtained.

EXAMPLE 2

This example shows the superior results obtained through the instant process, starting from similar substances.

17.5 g./l. of $Al_2(SO_4)_3 \cdot 18H_2O$ (corresponding to 2.74 g./l. of $Al_2O_3$) are added to a solution containing: 149.52 g./l. of $MgCl_2$, 127.7 g./l. of NaCl, 37.13 g./l. of $MgSO_4$ and 98.12 g./l. of $K_2SO_4$. The whole is heated to 85° C. A salt mixture consisting of: 54% of schoenite, 34.5% of NaCl and 11.5% of kainite is leached with this solution. Thus obtained are an undissolved residue (containing 90% of NaCl, 1.2% of $K_2SO_4$ and $Al_2O_3$ traces), which is separated, and a solution at 85° C. of: 138.06 g./l. of $MgCl_2$, 159.0 g./l. of NaCl, 70.78 g./l. of $MgSO_4$, 151.33 g./l. of $K_2SO_4$ and 2.65 g./l. of $Al_2O_3$.

Upon cooling this solution to 50° C. its composition becomes: 141.13 g./l. of $MgCl_2$, 135.38 g./l. of NaCl, 70.47 g./l. of $MgSO_4$ and 151.33 g./l. of $K_2SO_4$, corresponding to the separation of 26.5 g. of NaCl and 6.5 g. of schoenite per liter of solution at 85° C. This composition remains stable for 5 hours in the presence of the relevant solid phase and under vigorous agitation. The solution at 50° C., cooled to 25° C., gives a mother liquor with a composition very near that used at the beginning of the process (150.14 g./l. of $MgCl_2$, 127.0 g./l. of NaCl, 35.14 g./l. of $MgSO_4$, 96.38 g./l. of $K_2SO_4$ and 2.57 g./l. of $Al_2O_3$) and a salt consisting of: 0.87% of $MgCl_2$, 8.75% of NaCl, 25.6% $MgSO_4$, 37% $K_2SO_4$ and 0.082% $Al_2O_3$ (the rest being $H_2O$).

EXAMPLE 3

A solution containing: 149.7 g./l. $MgCl_2$, 127.5 g./l. NaCl, 34.2 g./l. $MgSO_4$, 96.1 g./l. $K_2SO_4$ and 2.44 g./l. $Al_2O_3$ (as sulfate) is heated to 85° C. This is used to leach a salt mixture as in the preceding example for 30 minutes.

The undissolved residue (containing 2.4% $K_2O$ and consisting essentially of sodium chloride) is not separated. The pulp is cooled to 50° C. after addition of a small portion of leaching solution, in order to compensate for the volume concentration of the liquid phase resulting from the cooling to 50° C.

The liquid phase at 85° C., before this dilution, has the composition: 138.54 g./l. $MgCl_2$, 158.94 g./l. NaCl, 71.62 g./l. $MgSO_4$, 148.0 g./l. $K_2SO_4$ and 2.35 g./l. $Al_2O_3$ and after dilution: 139.7 g./l. $MgCl_2$, 157.3 g./l. NaCl, 69.6 g./l. $MgSO_4$, 145.2 g./l. $K_2SO_4$ and 2.44 g./l. $Al_2O_3$. By cooling the latter to 50° C., a liquid phase containing: 143.05 g./l. $MgCl_2$, 135.38 g./l. NaCl, 72.02 g./l. $MgSO_4$ and 148.0 g./l. $K_2SO_4$ is obtained. This shows that an abundant precipitation of NaCl and practically no precipitation of $K_2SO_4$ occurred at between 85° and 50° C.

The said composition of the liquid phase at 50° C. remains constant for 6 hours. After cooling to 25° C., a mother liquor almost equal to the initial one (147.16 g./l. $MgCl_2$, 127.1 g./l. NaCl, 37.58 g./l. $MgSO_4$, 94.35 g./l. $K_2SO_4$ and 2.35 g./l. $Al_2O_3$) and a salt having: 1.13% $MgCl_2$, 9.2% NaCl, 24.7% $MgSO_4$, 35.8% $K_2SO_4$, 0.11% $Al_2O_3$ (the rest $H_2O$) are obtained.

EXAMPLE 4

A solution containing 166.6 g./l. of $MgCl_2$, 125.7 g./l. NaCl 25.34 g./l. $MgSO_4$, 106.7 g./l. $K_2SO_4$, is used for leaching, at 85° C., a salt mixture consisting of 42.5% schoenite, 34% NaCl, 3% KCl, 8.5% $MgSO_4$ (the rest $H_2O$). The saturation conditions at 85° C. correspond to the obtainment of a solid phase essentially consisting of NaCl and a liquid phase having: 156.4 g./l. $MgCl_2$, 149.3 g./l. NaCl, 67.4 g./l. $MgSO_4$, 144.67 g./l. $K_2SO_4$. This equilibrium however is not stable since after 3 hours of contact the transformation according to (1) occurs.

If aluminum sulfate in an amount of about 3 g./l. $Al_2O_3$ is added to the same starting solution, the leaching of the same salt mixture, carried out this time directly at 50° C., leads to an equilibrium state in which the liquid phase contains: 154.0 g./l. $MgCl_2$, 127.1 g./l. NaCl, 64.9 g./l. $MgSO_4$, 141.8 g./l. $K_2SO_4$, 2.86 g./l. $Al_2O_3$. Compared to the preceding leaching, this shows that carrying out the leaching under the new conditions not only saves on thermal energy but also clearly lowers the NaCl concentration with only a slightly lower saturation in $K_2SO_4$. This obviously results in a higher purity of the salt obtainable, in the successive cooling stage at 25° C.

EXAMPLE 5

A solution containing 146.8 g./l. $MgCl_2$, 124.6 g./l. NaCl, 61.6 g./l. $MgSO_4$, 81.1 g./l. $K_2SO_4$ and 1.94 g./l. $Al_2O_3$ (as nitrate) is used for leaching, at 50° C., a salt mixture consisting of: 47% schoenite, 35% NaCl, 9% kainite, 5% $MgSO_4 \cdot 7H_2O$, 4% moisture. The equilibrium solution at 50° C. has the composition: 136.1 g./l. $MgCl_2$, 136.7 g./l. NaCl, 90.0 g./l. $MgSO_4$, 124.9 g./l. $K_2SO_4$, 1.8 g./l. $Al_2O_3$ in which the concentration of saturation of $K_2SO_4$ is much lower, in respect of the preceding examples, because of the increased equilibrium concentration of $MgSO_4$.

The equilibrium of the said solution remains unaltered even after agitation for 20 hours at 50° C. with the relevant solid phase. More particularly, there is no transformation towards the double sodium-magnesium sulfates.

In order to obtain the same degree of saturation, but without the use of the aluminum salt, by starting with the same initial substances, it is necessary to increase heating up to about 75° C. At this temperature, however, the solution undergoes reactions (1), (2) due to the high $SO_4^{--}$ content.

The salt obtained by cooling the solution at 50° C. containing aluminum to 25° C., has an $Al_2O_3$ content of 0.08%.

EXAMPLE 6

A solution containing: 149.3 g./l. $MgCl_2$, 122.3 g./l. NaCl, 59.6 g./l. $MgSO_4$, 85.5 g./l. $K_2SO_4$ and 3.7 g./l. $Al_2O_3$ (as nitrate) is used for leaching, at 50° C., a salt mixture consisting of: 23.4% $K_2SO_4$, 21.6% $MgSO_4$, 27.8% NaCl, 2.75% KCl (the rest $H_2O$). The equilibrium solution at 50° C. has the composition: 135.6 g./l. $MgCl_2$, 134.7 g./l. NaCl, 90.8 g./l. $MgSO_4$, 127.65 g./l. $K_2SO_4$ and 3.35 g./l. $Al_2O_3$, in which the $K_2SO_4$ concentration is a little higher than in the preceding Example 5, due to the higher $Al_2O_3$ concentration. This represents, however, a value in excess of that required for the obtainment of a substantially not impure salt in the successive cooling stage.

In this example, the salt obtained by cooling the said solution to 25° C. contains 0.3% of $Al_2O_3$, namely an appreciable impurity which acts negatively also from the point of view of the loss of aluminum salt from the process. From the point of view of the stability, the solution behaves like that of Example 5. In order to have the same $K_2SO_4$ saturation, but in the absence of the aluminum salt, it is necessary to heat the solution to about 80° C. At this temperature reactions (1), (2), however occur rapidly.

EXAMPLE 7

A solution containing: 147.2 g./l. $MgCl_2$, 125.07 g./l. NaCl, 59.2 g./l. $MgSO_4$, 74 g./l. $K_2SO_4$, after addition of ferric sulfate in an amount of 1.6 g./l. of $F_2O_3$, is used for leaching, at 50° C., the salt mixture of the preceding example. The equilibrium solution at 50° C. contains: 136.2 g./l. $MgCl_2$, 135.5 g./l. NaCl, 97.5 g./l. $MgSO_4$, 124.7 g./l. $K_2SO_4$ (7.1).

It is stable for a time not less than 6 hours and upon cooling to 25° C. gives a salt having the composition: 1.25% $MgCl_2$, 11.6% NaCl, 23.9% $MgSO_4$, 33.9% $K_2SO_4$, 0.056% $F_2O_3$ (7.2).

In order to obtain the same warm saturation of $K_2SO_4$, in the absence of the ferric salt, and from the same starting substances, it is necessary to reach a temperature of about 85° C., whereby a solution is obtained which consists of: 137.9 g./l. $MgCl_2$, 146.3 g./l. NaCl, 105.0 g./l. $MgSO_4$, 124.5 g./l. $K_2SO_4$ (7.3).

This equilibrium state is stable for not more than 1 hour. Thereafter, transformation (1) which proceeds quickly occurs. The solution (7.3) cooled to 25° C. gives a salt having the composition: 1.05% $MgCl_2$, 18.4% NaCl, 22.3% $MgSO_4$, 30.5% $K_2SO_4$.

Substantially analogous results are obtained if, instead of ferric sulfate, chromic sulfate is added in equivalent concentration.

The solutions of type (7.3) not only represent an economical burden from the thermal point of view, but also represent metastable equilibrium states which can be hardly controlled in the industrial practice and, in the most favorable case, give a salt with a $K_2SO_4$/NaCl ratio closer to the analogous ratio of the starting raw salt as contrasted to that obtained from the solution of type (7.2).

EXAMPLE 8

A non-saturated solution, obtained by starting with a raw potassium salt containing NaCl, has the following composition: 138.3 g./l. $MgCl_2$, 135.1 g./l. NaCl, 81.2 g./l. $MgSO_4$, 100.2 g./l. $K_2SO_4$ (8.1).

It is evaporated at any temperature, up to near the limit of saturation with $K_2SO_4$. For instance at 90° C. its composition becomes: 160.05 g./l. $MgCl_2$, 135.48 g./l. NaCl, 93.8 g./l. $MgSO_4$, 115.44 g./l. $K_2SO_4$ (8.2).

This solution is supersaturated with $K_2SO_4$ and $MgSO_4$ (schoenite, which represents the useful salt) but also with NaCl, in respect of a given reference temperature, e.g. 15° C. Therefore, the cooling to this temperature would involve a low purification yield.

The solution (8.2) after addition of an aluminum salt, corresponding to a concentration of about 3 g./l. $Al_2O_3$, is brought to 50° C. At this temperature, there is an equilibrium which is stable for many hours, in which the liquid phase has the composition: 164.98 g./l. $MgCl_2$, 103.71 g./l. NaCl, 97.21 g./l. $MgSO_4$, 118.4 g./l. $K_2SO_4$ (8.3).

The solid phase practically consists only of NaCl with an impurity of $K_2SO_4$ (1.5%) which is to be attributed substantially to imbibition. The solution (8.3) is now supersaturated with $K_2SO_4$ and $MgSO_4$ (schoenite) but not with NaCl, in respect of the same reference temperature and therefore the salt obtained at 15° C. will substantially be free of NaCl.

A purification process of the starting raw salt, in which the degree of separation from sodium chloride is practically complete, is thus realized.

If, on the other hand, the solution (8.2) is cooled to 50° C. without addition of the aluminum salt, immediately an equilibrium occurs in which the liquid phase has the composition: 175.34 g./l. $MgCl_2$, 108.54 g./l. NaCl, 68.4 g./l. $MgSO_4$, 94.35 g./l. $K_2SO_4$ (8.4).

By comparison with composition (8.2) it is evident that in this case an abundant amount not only of $K_2SO_4$ and $MgSO_4$ but also of NaCl separated and therefore the effectiveness of the separation appears very moderate.

I claim:

1. A process for separating sodium chloride from solid mixtures with potassium salts which comprises leaching the starting mixture at 40–60° C. with an aqueous salt solution saturated with sodium chloride and potassium salt, to which from 1 to 4 g./l., calculated as metal oxide, of a water soluble salt selected from the group consisting of sulfates, chlorides and nitrates of $Al^{+++}$, $Cr^{+++}$ and $Fe^{+++}$ has been added thereby modifying the saturation equilibrium of the potassium salt, but not of the other ions present, separating the potassium salt enriched aqueous solution from the NaCl solid phase, and cooling the precipitate solution to 15–25° C. to separate the potassium salt.

2. The process according to claim 1, wherein the leaching is carried out at about 50° C.

3. The process according to claim 1, wherein the leaching equilibrium at 50° C. is preceded by an initial leaching stage at 80–100° C.

4. The process according to claim 1, wherein the starting mixture consists of mixtures of schoenite, kainite and sodium chloride and the salt separated at 15–25° C. consists of more than 80% schoenite.

References Cited

UNITED STATES PATENTS

| | | | |
|---|---|---|---|
| 2,470,822 | 5/1949 | Johnson | 23—300 |
| 2,642,335 | 6/1953 | May | 23—300 X |
| 2,788,257 | 4/1957 | Duke | 23—302 X |
| 2,927,010 | 3/1960 | Le Baron | 23—302 X |
| 3,281,206 | 10/1966 | Weele | 23—300 X |

FOREIGN PATENTS

| | | |
|---|---|---|
| 38,055 | 10/1923 | Norway. |
| 776,479 | 6/1957 | Great Britain. |

NORMAN YUDKOFF, *Primary Examiner.*

S. J. EMERY, *Assistant Examiner.*

U.S. Cl X.R.

23—89, 298, 300, 302, 312